United States Patent [19]

Hahn

[11] Patent Number: 4,974,336
[45] Date of Patent: Dec. 4, 1990

[54] DRYING METHOD

[75] Inventor: Granville J. Hahn, Big Spring, Tex.

[73] Assignee: Permian Research Corporation, Big Spring, Tex.

[21] Appl. No.: 368,879

[22] Filed: Jun. 20, 1989

Related U.S. Application Data

[62] Division of Ser. No. 160,521, Feb. 26, 1988, Pat. No. 4,839,969.

[51] Int. Cl.⁵ .............................................. F26B 3/14
[52] U.S. Cl. ............................................ 34/22; 34/32
[58] Field of Search ................. 34/179, 180, 181, 182, 34/183, 165, 166, 168, 169, 10, 22, 12, 32, 35

[56] References Cited

U.S. PATENT DOCUMENTS 151,640  6/1974  Wheelwright ........................ 34/173
3,875,683  4/1975  Waters .................................. 34/169

Primary Examiner—Henry A. Bennet
Attorney, Agent, or Firm—Ross, Howison, Clapp & Korn

[57] ABSTRACT

A method for use in drying particulate matter employing a drier comprising a cylindrical upper section, a frustoconical lower section, a rotatable shaft extending substantially the entire length of the interior of the drier, a plurality of axially spaced arrays of circumferentially spaced, radially extending stirring arms appended to the shaft, and at least two perforated frustoconical separators mounted within the drier in fixed, inverse and spaced apart relation to each other, and means for introducing a heated gas into the drier for contacting and drying the particulate matter, the stirring arms and separators cooperating to retard agglomeration of the particulate matter.

21 Claims, 3 Drawing Sheets

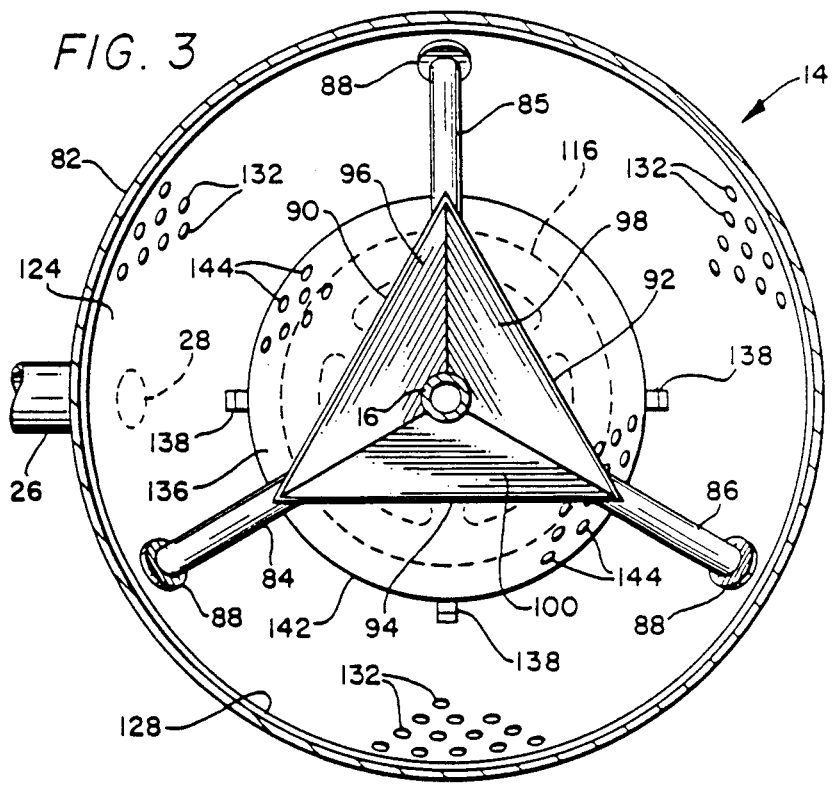
FIG. 3
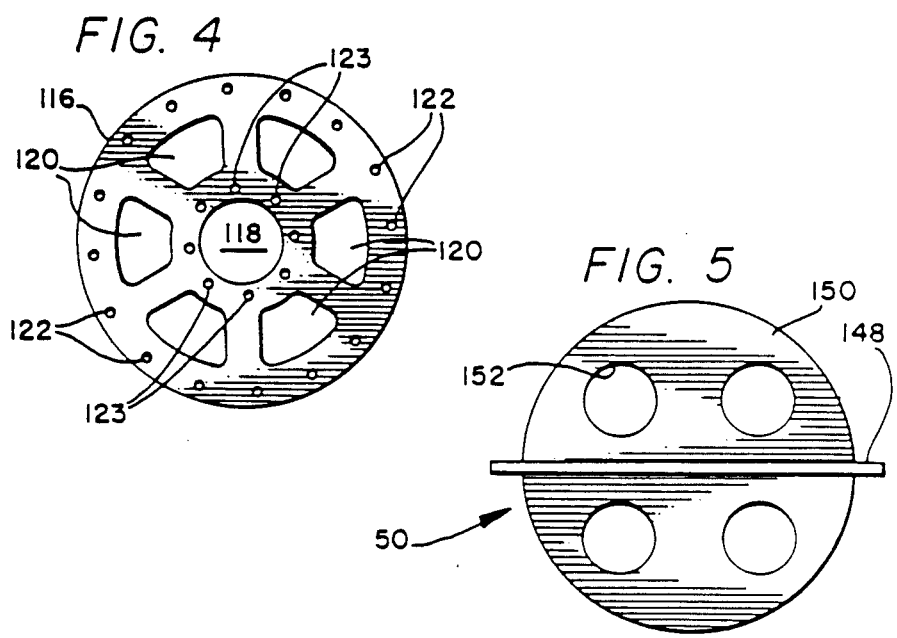
FIG. 4
FIG. 5

DRYING METHOD

CROSS REFERENCE TO RELATED APPLICATION

This application is a divisional of Application Ser. No. 07160,521, filed Feb. 26, 1988, entitled "DRYING METHOD AND APPARATUS", now U.S. Pat. No. 4,839,969.

TECHNICAL FIELD

This invention relates to a drying method and more particularly, to a method for use in drying polymers. One aspect of the invention particularly relates to a method and apparatus for drying crystalline polymers such as polyethylene terephthalate pellets or granules. Another aspect of the invention relates to a method for aftercondensing polycondensed polymers such as polyesters and polyamides.

BACKGROUND ART

The need for driers that can effectively and efficiently reduce the moisture content of finely divided materials is well known. One problem commonly encountered in drying such materials is clumping or agglomeration. Some prior art methods and apparatus have utilized rotating shafts and stirring arms to stir particulate matter during drying. Others have utilized hot gas injected under high pressure to fluidize a bed of particulate matter during drying. Still others have employed stirring devices in combination with the injection of hot gas to effect drying. However, problems are still encountered with the conventional, commercially available driers, and their methods of use.

Such problems include, for example, packing of moist particulate matter by the rotating stirring arms; channeling that leads to incomplete drying, agglomeration and spot overheating; carryover of entrained solids from driers into filters and overhead recovery systems; inability to effectively remove undesirable reaction products; excessive energy use; and the like.

Drying is often required in order to satisfactorily prepare amorphous or crystalline polymers for subsequent molding or extrusion operations. For example, polyethylene terephthalate (PET) pellets used in molding carbonated beverage bottles is typically dried prior to injection molding the parisons from which the bottles are later blown.

Conventional methods and apparatus for the aftercondensation of amorphous polymers are disclosed in U.S. Pat. No. 4,585,366, and the references cited therein. Two primary problems previously encountered in the aftercondensation of amorphous polymers, and polyesters in particular, are agglutination and the removal of undesirable gaseous reaction products such as acetaldehydes. The removal of aldehydes from a static bed of crystalline PET by forced air or inert gas is specifically addressed in U.S. Pat. No. 4,230,819.

In previously disclosed methods and systems designed to overcome these two primary problems, other problems have been encountered which have also limited their usefulness and efficiency. Thus, rotary drum driers have been employed to limit agglutination, but their effectiveness has been hampered by dust formation, high energy consumption, and the need for operating in a batch rather than continuous process.

The use of simple shafts or columns as drying vessels has resulted in agglomeration of the granulate in the upper portions of such vessels, necessitating the use of crushing or peeling devices in the discharge section to break up the clumps, which again boosts energy consumption and causes dust formation.

To avoid such problems, others have employed fluidized beds for precrystallizing the polymer prior to recondensation. With fluidized beds, however, it is difficult to control residence time of the particles. Energy requirements are also great, and separate vessels are required for each step of the two-stage process.

In U.S. Pat. No. 4,584,366, the inventors disclose an apparatus comprising a single vessel with two stacked sections. The upper section contains an agitator preferably comprising a rotary shaft having flat stirring bars appended thereto. The lower section, into which the polymer flows under gravitational force from the upper section, is merely a cylindrical vessel through which the polymer flows without separation or interruption. Hot inert gas is injected into the lower portion of each section, and flows upwardly through the polymer bed to a collection system where it is filtered, dried, reheated and recirculated to the vessel. However, the apparatus disclosed in U.S. Pat. No. 4,584,366 requires a residence time of 5 hours to adequately dry and recondense PET granulate.

A polymer drier, drier system and method of operation are therefore needed that will permit finely divided particulate matter, and more particularly, polymer materials such as PET pellets or granulate to be dried in a much shorter time than five hours, thereby achieving correspondingly greater throughput. This advantage should desirably be attained without increasing the required capital investment and operating expenses to such an extent that the resultant advantage in throughput is more than offset by these other factors. Also, the advantage in throughput must be achieved without sacrificing the physical properties of the product. With PET granulate intended for use in food grade applications, for example, this means that the acetaldehyde level of the recondensed polymer should be maintained below a specified maximum level. Also, moldability and structural integrity of the products to be molded from the recondensed polymer may require that the intrinsic viscosity of the dried and recondensed polymer be maintained within a specified acceptable range.

According to the present invention, a drier, drier system and method are provided that achieve all of the foregoing advantages without any associated disadvantages that would negate the benefits to be achieved through use of the invention.

SUMMARY OF THE INVENTION

The drier of the present invention is designed to contact particulate matter flowing downward through a cylindrical vessel with a countercurrent flow of heated gas.

According to one embodiment of the present invention, an improved single-stage polymer drier is provided that employs a specially designed rotary agitator in cooperation with a plurality of specially designed baffles and foraminous separators to achieve improved drying and polymer throughput without agglomeration. The rotary agitator utilized in the invention preferably comprises a centrally disposed rotatable shaft having attached in fixed relation thereto a plurality of axially-spaced arrays of circumferentially-spaced, downwardly inclined stirring arms. When used in accordance with the method of the invention, the subject apparatus demonstrates excellent effectiveness in drying and removing gaseous reaction products from polycondensates.

According to another embodiment of the invention, an improved drier system is disclosed that utilizes the novel single-stage drier of the invention in combination with a specially designed gas flow control mechanism to prevent overheating or agglomeration of particulate matter residing in the drier during a cessation of flow through the drier outlet.

According to another embodiment of the invention, a method is disclosed for drying polymers through use of the subject drier and drier system. According to a particularly preferred embodiment of the subject method, beneficial results are achieved by contacting the downwardly flowing polymer with an upwardly flowing stream of air or inert gas such as nitrogen at a temperature ranging between about 340 and 385 deg. F. (about 170-200 deg. C.) in a ratio of from about 1.0 to about 1.5, and most preferably about 1.3, cubic feet of gas per minute to 1 pound per hour of polymer.

BRIEF DESCRIPTION OF THE DRAWINGS

The invention is further described and explained in relation to the following drawings wherein like numerals are used to identify like parts in each figure:

FIG. 3 is a sectional plan view of the drier of the invention taken along line 3—3 of FIG. 2;

FIG. 4 is a plan view depicting shaft anchor plate 116 of the drier of the invention as shown in FIG. 2; and FIG. 5 is a plan view depicting the gas flow control plate employed with the gas flow control mechanism of the drier system of the invention.

DESCRIPTION OF THE PREFERRED EMBODIMENTS

Figure 1:
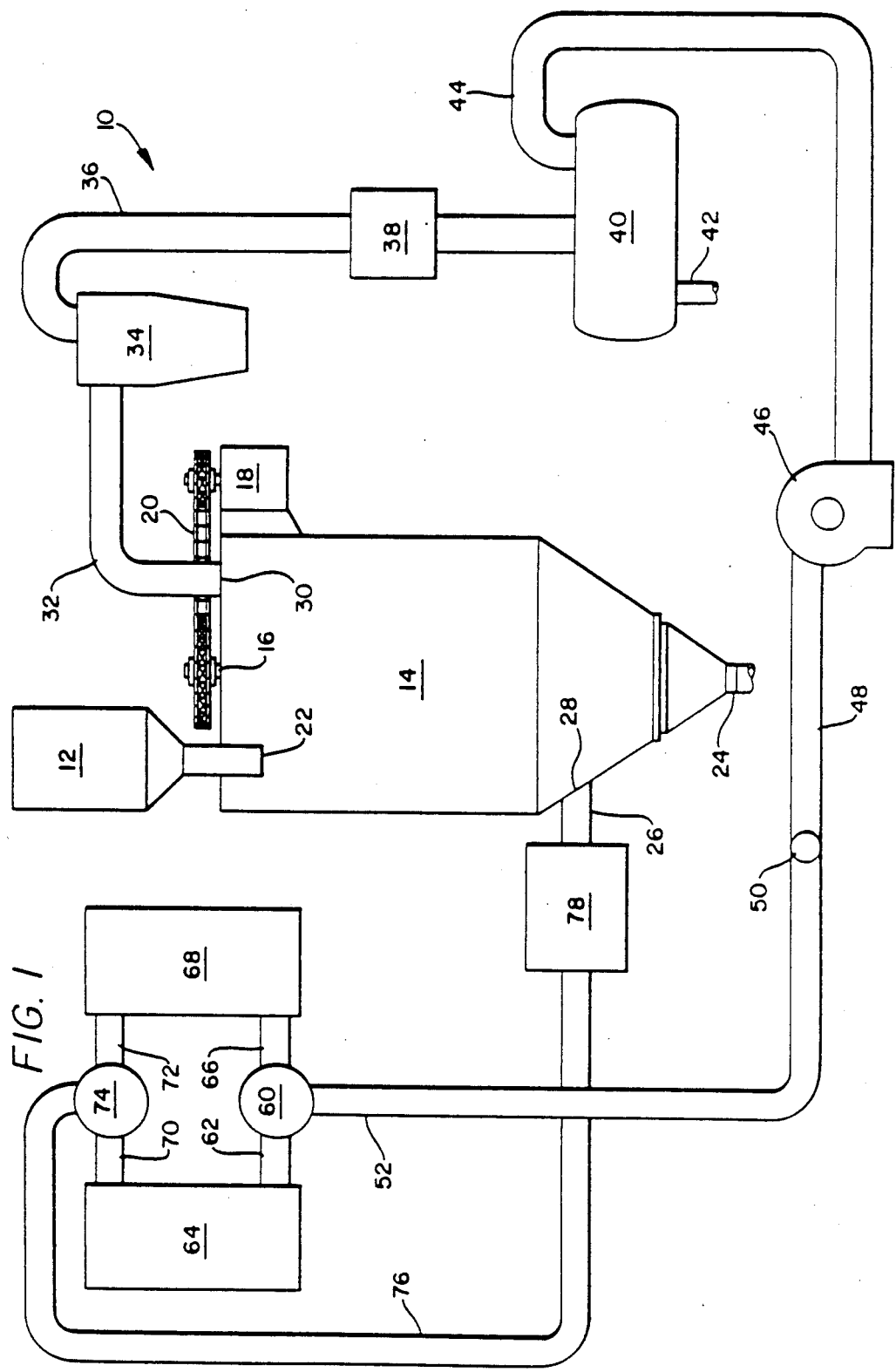
FIG. 1 is a simplified flow diagram depicting the drier system of the invention.

Drier system 10 preferably comprises drier 14, and the related auxiliary equipment depicted in simplified form in FIG. 1. Referring to FIG. 1, drier system 10 preferably also includes feed hopper 12, cyclone 34, filter 38, overhead condenser 40, blower 46, gas flow control mechanism 50, desiccators 64, 68, directional inlet flow control valve 60, directional outlet flow control valve 74, and gas heater 78.

Particulate material is supplied to drier 14 from feed hopper 12 through feed inlet 22. The particulate feedstock can comprise any of numerous types of relatively finely divided particulate solid material or mixtures thereof including, for example, grain and grain products; sand; wood flour; fertilizer and other granular chemical compounds; polymer granules, flakes or pellets (whether amorphous, partially crystalline or crystalline, and whether virgin or regrind); and the like.

Particulate matter entering drier 14 through feed inlet 22 flows downwardly through the vessel by gravity flow, eventually exiting through outlet 24. Hot gas is blown into drier 14 from gas supply line 26 through gas inlet port 28. The hot gas preferably comprises air or a relatively inexpensive inert gas such as nitrogen. The hot gas rises through the particulate matter inside drier 14, heating and drying the particulate matter while picking up moisture, fines and, in some cases reaction products.

After passing upward through the particulate matter, the spent gas exits through gas outlet port 30, and flows through cyclone 34 and microfilter 38 to first remove entrained fine particulate matter. The filtered gas then flows into condenser 40, which is preferably cooled by cooling tower water, to condense out much of the liquid prior to entering desiccators 64, 68. The condensed liquid flows out of condenser 40 through condensate drain 42, and the uncondensed gas passes overhead through blower feed line 44 to blower 46. Blower 46 discharges the gas through blower exhaust line 48, gas flow control mechanism 50, and desiccator feed line 52.

The flow of gas through desiccator feed line 52 is alternately directed to one or the other of desiccators 64, 68 by directional inlet flow control valve 60. Two desiccators are preferably employed in drier system 10 in order that one desiccator can be utilized to remove additional water vapor from the gas while the other desiccator is undergoing regeneration. According to one preferred embodiment of the invention, desiccators 64, 68 each contain about 1050 pounds of 4 ADG ⅛" pellets of MicroSeive dessicant marketed by Union Carbide Corporation, and flow is diverted from one desiccator to the other about every four hours during continuous operation. After each four hour cycle, the desiccant material in the desiccator not then in use is regenerated by means of a conventional auxiliary heater and blower system that is not shown in FIG. 1.

After passing through the desiccant bed, the gas exits the desiccator through the applicable outlet line 70, 72, and directional outlet flow control valve 74 into heater feed line 76.

Heater feed line 76 supplies the filtered and dried gas to heater 78, in which the gas is once again heated to the desired temperature for injection through gas supply line 26 and inlet port 28 into drier 14. Any make-up gas required by the recirculating gas system to compensate for leakage or other loss is desirably introduced into the system adjacent the inlet to blower 46. Depending upon the particulate matter being dried, and the applicable temperatures and flow rates, further energy conservation may be obtained in some instances by circulating gas leaving desiccators 64, 68 through a conventional gas-gas heat exchanger adapted to transfer thermal energy from the overhead gas stream at a point between drier 14 and condenser 40 prior to entering gas heater 78.

Drier 14 is further described with reference to FIGS. 2 through 4 of the drawings. Drier 14 is preferably a substantially cylindrical vessel comprising top wall 80 and side wall 82. The upper portion of side wall 82, which comprises a major portion of its length, is preferably substantially cyclindrical. The lower portion of side wall 82, which comprises a minor portion of its length, is preferably inwardly inclined as it extends downwardly from the substantially cylindrical upper portion of side wall 82. The lower portion of side wall 82 thereby defines a frustoconical section having a top diameter that corresponds to the diameter of the upper portion and a bottom diameter that corresponds to the diameter of outlet 24. Agitator shaft 16 is preferably rotatably mounted coaxially with the vertical axis of side wall 82.

According to a preferred embodiment of the invention, shaft 16 is 5 inches in diameter. The lower end of shaft 16 is disposed inside the vessel near outlet 24, and is supported by bearings 114 bolted to shaft anchor plate 116. Referring to FIG. 4, shaft 16 extends downward through orifice 118, and bearings 114 are bolted to shaft anchor plate 116 through bolt holes 123. The top of shaft 16 extends upward through top wall 80 as shown in FIG. 1, and is driven by motor 18 through chain drive 20. According to a preferred embodiment of the invention, motor 18 is rated at 20 horsepower.

A plurality of axially-spaced sets of circumferentially-paced stirring arms are preferably connected in fixed relation to shaft 16. The number and spacing of the stirring arms can vary in relation to the overall size of drier 14, but according to one preferred embodiment of the invention, the configuration depicted in the drawings can be satisfactorily employed with an apparatus having a throughput of about 1000 pounds of polymer per hour.

Figure 2:
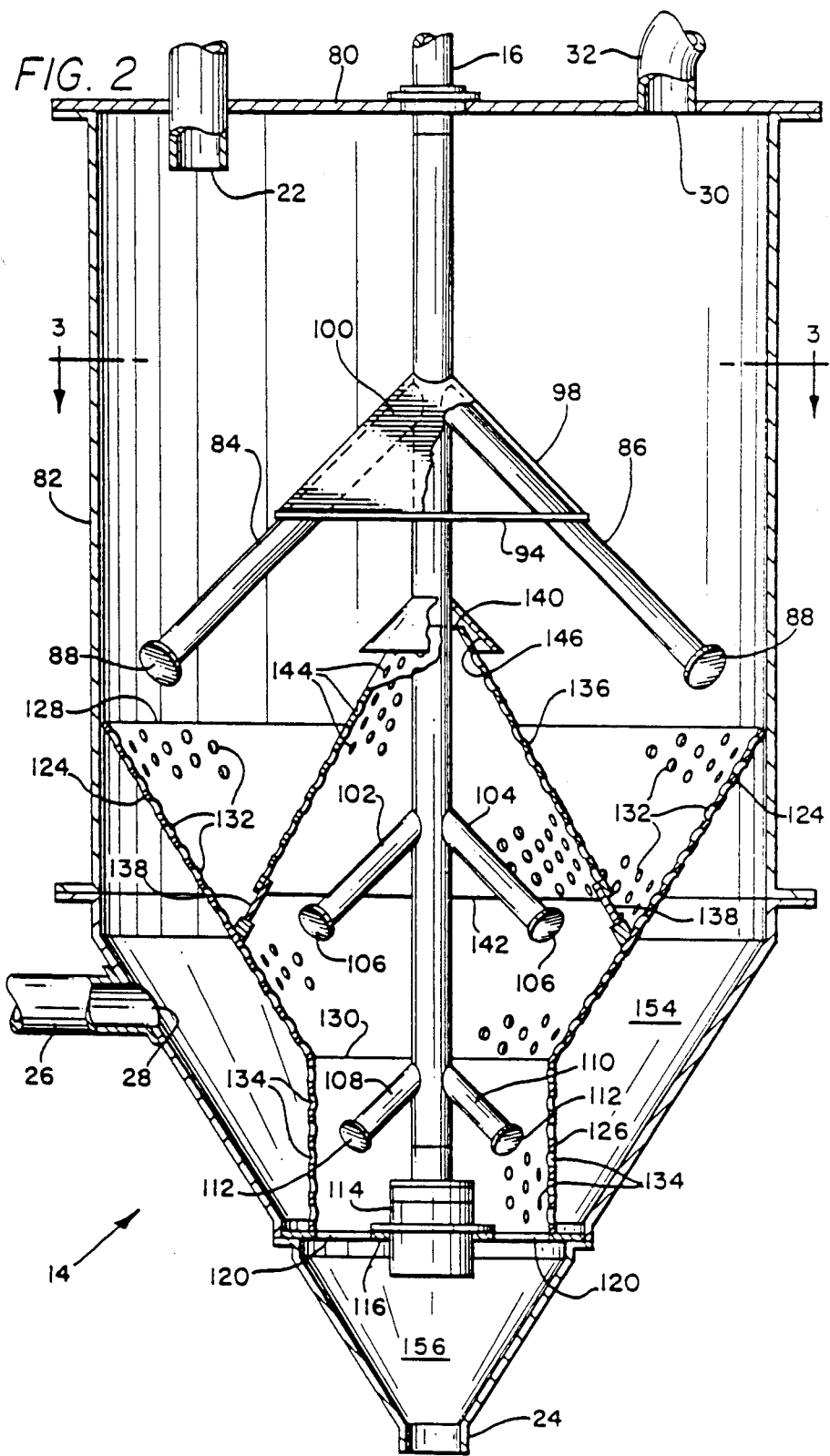
FIG. 2 is a sectional elevation view depicting the internal structure of the drier of the invention.

Referring to FIGS. 2 and 3, the uppermost set of stirring arms comprises stirring arms 84, 85, 86, which are preferably connected to shaft 16 at a point disposed near, and most preferably, slightly below the level within drier 14 to which particulate material is to remain filled during continuous operation. Each stirring arm is preferably of smaller diameter than shaft 16, and is downwardly inclined so as to form an included angle with shaft 16 of from about 40 to about 45 degrees. End caps 88 are provided at the end of each stirring arm 84, 85, 86. Support rods 90, 92, 94 extend transversely between stirring arms 84, 85, 86 to provide lateral structural support. The length of stirring arms 84, 85, 86 is preferably such that the arms will extend to within about 2.5 inches of the inwardly facing surface of side wall 82.

The next axially-spaced set of circumferentially-spaced stirring arms comprises stirring arms 102, 104 and a third stirring arm disposed beneath stirring arm 85 that is not visible in FIGS. 2 or 3. Each of stirring arms 102, 104 and the third stirring arm further comprises an end cap 106. The third axially-spaced set of stirring arms comprises stirring arms 108, 110 and a third stirring arm disposed beneath stirring arm 85 that is not visible in FIGS. 2 or 3. Each of stirring arms 108, 110 and the third stirring arm further comprises an end cap While the axially-spaced sets of stirring arms shown in FIG. 1 are depicted in stacked alignment for ease of illustration, it will be understood that each respective axially-spaced set of stirring arms can be attached to shaft 16 in positions that are circumferentially rotated relative to the next adjacent set of stirring arms so as to obtain a more overlapped stirring pattern within the vessel. It will also be understood that while each axially-spaced set of stirring arms shown in FIG. 1 comprises three stirring arms, the number of stirring arms can be varied in each axially-spaced set. According to a preferred embodiment of the invention, the stirring arms in each axially-spaced set are evenly spaced circumferentially around shaft 16, and all stirring arms in drier 14 are fabricated from 1 inch diameter Schedule 80 pipe.

As shown in FIG. 2, the length of the stirring arms in each of the two lower sets of stirring arms is shorter than the length of the stirring arms in the set or sets above it. According to a preferred embodiment of the invention, the length of the stirring arms in each axially-spaced set will be equal, and will be such that the radial distance between the outermost extending part of the stirring arm and the next closest portion of the stationary internal structure of polymer drier and recondenser 14 will be between about 1 and about 3 inches, and most preferably, between about 2 and 2.5 inches. Depending upon the length and diameter of the stirring arms, and the magnitude of the forces exerted on them during agitation, lateral support rods for the shorter stirring arms may be required.

Referring again to FIGS. 2 and 3, drier 14 preferably further comprises primary flow separator 124, which is preferably a frustoconical, foraminous metal structure defined by top edge 128 and bottom edge 130, having a first upwardly and inwardly facing surface and a second downwardly and outwardly facing surface, and having a thickness of about $\frac{1}{8}$ inch. Top edge 128 is preferably fixed such as by welding to side wall 82 at a point above the level at which side wall 82 becomes inwardly inclined. Bottom edge 130 is preferably coextensive with the top edge of cylindrical outlet flow separator 126. Outlet flow separator 126 is desirably fabricated from the same metal as primary flow separator 124 and is connected in fixed relation thereto, such as by welding or other similarly effective means.. The base of outlet flow separator 126 is preferably connected in fixed relation to shaft anchor plate 116 radially outside of polymer orifices 120, either by welding or by bolting a flange (not shown in FIG. 2) along its bottom edge through holes 122. Primary flow separator 124 and outlet flow separator 126 are each preferably perforated across their surfaces with $\frac{1}{8}$ inch diameter holes 132, 134, respectively, drilled in a diamond pattern on 3/16 inch spacing. The diameter of holes 132, 134 can vary from the size stated herein depending upon the average particle diameter of the particulate matter, and is preferably about the same size as or slightly smaller than the average particle diameter. To simplify illustration, only representative holes 132, 134 are shown in FIGS. 2 and 3.

When primary flow separator 124 and outlet flow separator 126 are constructed as disclosed herein, they cooperate to define plenum 154 in which relatively dry heated gas introduced through gas inlet port 28 is distributed over substantially the entire cross-sectional area of drier 14 so as to rise through the polymer distributed across its cross-sectional area. The circulation and distribution of heated gas within plenum 154 can be further assisted by the installation of conventional baffles (not shown) within plenum 154, which baffles can be attached to the interior of side wall 82.

Auxiliary separator 136 is another frustoconical, foraminous metal structure preferably disposed within side wall 82 of drier 14, and is adapted to cooperate with the stirring arms discussed above and primary flow separator 124 in establishing beneficial contact between the downwardly flowing particulate matter and the upwardly flowing heated gas, while simultaneously retarding agglomeration. Bottom edge 142 of auxiliary separator 136 is preferably spaced about 3 inches away from the upward facing surface of primary flow separator 124. Auxiliary separator 136 is preferably supported by and maintained in fixed relation to primary flow separator 124 by a plurality of mounting brackets 138 circumferentially spaced around bottom edge 142. Top edge 140 of auxiliary separator 136 is preferably closely adjacent to, but not contacting, shaft 16. Auxiliary separator 136 is preferably perforated across substantially all of its surface with $\frac{1}{8}$ inch diameter holes 144 having 3/16 inch spacings. Where the particle size of the particulate matter is too great to permit any appreciable downward particle flow through auxiliary separator 136, a plurality of spaced holes 144 having a diameter larger than the average particle size of the particulate matter can be interspersed with small diameter holes 144 to provide better flow distribution through drier 14.

Downwardly inclined deflector shield 146 is preferably attached to rotating shaft 16 slightly above top edge 140 of auxiliary separator 136, and extends radially outward therefrom sufficiently to prevent downwardly flowing particulate matter from channelling through the gap between top edge 140 and shaft 16. When installed in this manner, deflector shield 146 also functions to prevent the heated gas from channeling upward along shaft 16.

Triangularly shaped baffle plates 96, 98, 100 welded to stirring arms 84, 85, 86 and shaft 16 are also effective for limiting the channeling of upwardly flowing heated gas along shaft 16, and provide additional lateral support for the stirring arms as well. A similar function could of course be satisfactorily achieved by installing additional axially-spaced deflector shields such as deflector shield 146, possibly of varying diameters, at other points along shaft 16.

When constructed as described herein, drier 14 can be effectively operated according to the method of the invention. According to a preferred embodiment of the method of the invention, crystalline PET pellets are introduced into drier 14 through feed inlet 22 at a flow rate of about 1000 pounds per hour. Experience has shown that desirable results are achieved when the lower end of feed inlet 22 is disposed approximately 5 inches below top wall 80.

Agitator shaft 16 is controlled so as to rotate at less than about 10 revolutions per minute, and preferably at about 3.5 revolutions per minute.

Heated gas, preferably air or nitrogen at a dew point ranging between about −30 deg. F. and about −60 deg. F., and most preferably about −50 deg. F., is heated in heater 78 to a temperature between about 340 and about 385 degrees F., and most preferably about 380 degrees F. The heated gas is then introduced into plenum 154 of drier 14 at a flow rate ranging between about 1000 and about 1500 cubic feet per minute, and most preferably, about 1350 feet per minute. This flow rate corresponds to a range of from about 60 to about 90 cubic feet of heated gas per pound of particulate matter, and preferably, about 80 cubic feet of heated gas per pound of particulate matter.

As the particulate matter flows downward through drier 14, it is subjected to stirring agitation by rotating shaft 16, and the attached stirring arms. The particulate matter is simultaneously contacted by the heated gas as it rises through the vessel. The force exerted by the heated gas on the downward flowing particulate matter is desirably sufficient to penetrate the entire drier 14, and contact each particle without being so great as to fluidize the particulate matter or entrain any appreciable amount of particulate (other than fines) in the exhaust gas passing through gas outlet port 30.

When PET pellets are dried according to this method, excellent results are achieved in obtaining dried product having satisfactorily high intrinsic viscosities and satisfactorily low acetaldehyde levels in comparison to comparable prior art devices.

According to another preferred embodiment of the method and system of the invention, damper mechanism 50 depicted in simplified form in FIGS. 1 and 5 is desirably employed to restrict the flow of heated gas through drier 14 during any prolonged cessation of particulate flow through outlet 24. Damper mechanism 50 preferably comprises gas flow control plate 150, which is connected in fixed relation to rotable spindle 148. Gas flow control plate 150 is desirably disposed inside blower outlet line 48, and the diameter of gas flow control plate 150 is preferably slightly less than the inside diameter of blower outlet line 48. Rotatable spindle 148 desirably extends through the walls of blower outlet line 48, and is adapted by conventional, commercially available electromechanical control means (not shown) to be selectively rotated between a first position wherein the major surfaces of gas flow control plate 150 do not significantly impede the flow of gas through blower outlet line 48, and a second position where the major surfaces of gas flow control plate 150 are substantially transverse to the direction of flow of gas through blower outlet line 48. Gas flow control plate 150 is preferably further provided with a plurality of orifices 152 adapted to permit about half, and preferably from about 40 to about 60 percent, of the gas flow past damper mechanism 50 whenever gas flow control plate 150 is in the transverse position as compared to the amount of gas that can otherwise flow past damper mechanism 50 whenever gas flow control plate 150 is in the first position.

According to a preferred method of the invention employing damper mechanism 50, the subject drier system is started up by opening feed inlet 22 and actuating motor 18 to rotate shaft 16 within drier 14. Blower 46 is also actuated and gas heater 78 is set so as to heat the circulating gas to the desired temperature. The drier system is desirably operated in this manner for about 1 hour with the outlet 24 closed to heat up drier 14 and approach steady-state operating conditions. Outlet 24 is then opened and the discharge of dried particulate matter commences. If it later becomes necessary to stop the discharge of dried particulate matter from outlet 24, the amount of heat and/or agitation imparted to material within drier 14 during such stoppage or cessation of flow can be selectively controlled by controlling the rotational rate of shaft 16, by controlling damper mechanism 50 to restrict the gas flow rate, and by controlling the temperature of the circulating gas.

Where the particulate matter is PET pellets, and outlet 24 is adapted to flood feed an injection molding machine, the method of the invention has been successfully employed during short stoppages of the injection molding machine as follows. First, employing well known, commercially available devices in the method of the invention, a toggle switch triggers a delay timer whenever the injection molding machine is stopped. For stoppages of under two minutes, no change is effected in the operation of the drier system of the invention. After a stoppage of two minutes, however, a conventional microprocessor signals motor 18 to shut down, thereby stopping the rotational motion of shaft 16 and the stirring arms within drier 14. The microprocessor simultaneously signals damper mechanism 50, which is so adapted by conventional means such as air cylinders well known to those of ordinary skill in the art, to rotate gas flow control plate 150 to its transverse position, thereby restricting the gas flow rate to approximately 650 cubic feet per minute, compared to approximately 1350 cubic feet per minute during continuous operation. For stoppages substantially longer than two minutes, it may also be desirable to lower the temperature setting of gas heater 78 to avoid scorching the PET pellets within drier 14. Once the injection molding machine receiving material from outlet 24 is restarted, the aforementioned steps are reversed, and the temperature is brought back up, gas flow control plate 150 is rotated to its open position, and motor 18 is actuated, commencing rotation of shaft 16.

The subject method and apparatus are particularly effective for reducing the acetaldehyde level in injection molded PET parts made from PET pellets dried as disclosed herein. Acetaldehyde levels lower than 3 parts per million are consistently achieved in injection molded PET parts made from PET pellets dried in the apparatus of the invention while practicing the subject method utilizing air as the heated gas, a gas inlet temperature of about 380 degrees F., a gas flow rate of about 1350 cubic feet per minute, a PET flow rate of about 1000 pounds per hour, and a shaft rotation rate of about 3.5 revolutions per minute.

Moreover, through use of the present invention, these highly desirable results are achieved at an energy savings of about 30% in comparison to the closest comparable conventional driers. The significant improvements in energy efficiency experienced through use of the present invention are believed to be attributable to the improved contact and thermal energy transfer between heated gas and particulate matter that is achieved through improved agitation and flow distribution within the subject drier in cooperation with particularly beneficial gas flow rates. Such energy savings are easily translated into significantly reduced operating costs which, coupled with the highly desirable physical properties of the resultant product, offer molders attractive economic incentives for utilizing the method and apparatus of the invention.

Other alterations and modifications of the subject drier, system and method will become obvious to those of ordinary skill in the art upon reading the subject disclosure, and it is intended that the present invention be limited only by the broadest interpretation of the appended claims to which the inventor may be legally entitled.

What is claimed is:

1. A method for drying particulate matter, said method comprising the steps of:

introducing said particulate matter into a vessel having a vertically disposed substantially cylindrical upper section and a frustoconical lower section, said vessel further comprising a coaxially disposed rotatable shaft extending downwardly through said vessel for substantially the entire length of said vessel; a plurality of axially spaced arrays of circumferentially spaced, radially extending, downwardly inclined stirring arms connected to said shaft; and a plurality of coaxially disposed, perforated frustoconical separators mounted in fixed relation to said vessel and inversely to each other so as to permit said particulate matter to flow downwardly through said vessel, said separators cooperating with said stirring arms to retard agglomeration of said particulate matter within said vessel;

introducing relatively dry, heated gas into the lower section of said vessel in an amount ranging from about 60 to about 90 cubic feet per pound of particulate matter in such manner that said gas is distributed over substantially the entire cross-sectional area of said vessel and directed upwardly through said vessel;

contacting said downwardly flowing particulate matter with said upwardly directed heated gas while agitating said particulate matter by rotating said shaft;

discharging said particulate through an outlet disposed in the lower section of said vessel;

recovering said heated gas through an outlet in the top of said vessel;

filtering entrained particulate matter from said recovered gas;

condensing water vapor from said recovered gas;

drying said recovered gas;

reheating said recovered gas; and recirculating said reheated gas to said vessel.

2. The method of claim 1 wherein said particulate matter comprises a polymer.

3. The method of claim 2 wherein said particulate matter is selected from the group consisting of polycondensates.

4. The method of claim 3 wherein said particulate matter is selected from the group consisting of polyesters.

5. The method of claim 4 wherein said particulate matter is selected from the group consisting of polyethylene terephthalate pellets, polyethylene terephthalate granules, polyethylene terephthalate flakes, and mixtures thereof.

6. The method of claim 2 wherein the heated gas introduced into said vessel has a dew point ranging between about $-30$ degrees F. and about $-60$ degrees F.

7. The method of claim 6 wherein said heated gas has a dew point of about $-50$ degrees F.

8. The method of claim 1 wherein said heated gas further comprises a major portion of an inert gas.

9. The method of claim 8 wherein said inert gas is nitrogen.

10. The method of claim 5 wherein said heated gas is introduced into said vessel at a temperature ranging between about 170 degrees C. and about 200 degrees C.

11. The method of claim 1 wherein the amount of heated gas introduced into said vessel is about 80 cubic feet per pound of particulate matter.

12. The method of claim 1, further comprising the step of restricting the flow rate of said heated gas by about one half upon cessation of flow of said particulate matter through said vessel.

13. The method of claim 1, further comprising the step of reducing the temperature of said heated gas upon cessation of flow of said particulate matter through said vessel.

14. The method of claim 1, further comprising the step of reducing the rate of rotation of said shaft upon cessation of flow of said particulate matter through said vessel.

15. A method for drying particulate matter comprising a major portion of polyethylene terephthalate, said method comprising the steps of:

introducing said particulate matter into the top portion of a drier having a rotatable shaft with stirring arms attached to said shaft, and flow separators within said drier adapted to distribute the flow of said particulate matter as said particulate matter flows downwardly through said drier;

introducing into the bottom portion of said drier a gas heated to a temperature between about 340 degrees F. and about 385° F., at a dew point ranging between about -30 degrees F. and about $-60$ degrees F., at a rate ranging from about 60 to about 90 cubic feet of heated gas per pound of particulate matter;

contacting said particulate matter with said gas within said drier while rotating said shaft;

discharging said gas from the top portion of said drier after said gas has contacted said particulate matter; and recovering said particulate matter from said drier.

16. The method of claim 15 wherein said gas is introduced into said drier at a temperature of about 380 degrees F.

17. The method of claim 15 wherein said gas is introduced into said drier at a dew point of about −50 degrees F.

18. The method of claim 15 wherein said gas is introduced into said drier at a flow rate of about 80 cubic feed of heated gas per pound of particulate matter.

19. The method of claim 15 wherein said shaft is rotated at a rate of less than about 10 revolutions per minute.

20. The method of claim 18 wherein said shaft is rotated at a rate of about 3.5 revolutions per minute.

21. The method of claim 15 wherein the rate of introduction of said heated gas into said drier is reduced by from about 40 to about 60 percent during a dessation of flow of said particulate matter through said drier.

* * * * *

UNITED STATES PATENT AND TRADEMARK OFFICE
CERTIFICATE OF CORRECTION

PATENT NO. : 4,974,336

DATED : December 4, 1990

INVENTOR(S) : Granville J. Hahn

It is certified that error appears in the above-identified patent and that said Letters Patent is hereby corrected as shown below:

Column 5, Line 8:
  Insert --s-- before paced

Column 5, Line 41:
  Insert --112-- after cap

Column 12, Line 6:
  Delete [feed] and insert --feet--

Column 12, Line 14:
  Delete [dessation] and insert --cessation--

Signed and Sealed this

Eighth Day of December, 1992

*Attest:*

DOUGLAS B. COMER

*Attesting Officer*     *Acting Commissioner of Patents and Trademarks*